United States Patent Office 3,752,706
Patented Aug. 14, 1973

3,752,706
METHOD FOR PRODUCING AN ELECTRO-
CHEMICALLY ACTIVE MATERIAL FOR
NICKEL HYDROXIDE ELECTRODES
Ake Lennart Melin, Oskarshamn, Sweden, assignor to
Svenska Ackumulator Aktiebolaget Jungner, Oskarshamn, Sweden
Filed Jan. 15, 1970, Ser. No. 3,149
Claims priority, application Sweden, Jan. 31, 1969,
1,368/69
Int. Cl. H01m 43/00, 43/04
U.S. Cl. 136—24
1 Claim

ABSTRACT OF THE DISCLOSURE

Method and apparatus for producing electrochemically active metal hydroxides for nickel hydroxide electrodes for alkaline accumulators by precipitation of the hydroxides from a solution of metallic salts with the aid of an alkaline metal hydroxide solution, according to which the precipitation, in order to obtain a uniform crystallinity throughout the material, takes place continuously in at least one step by allowing the salt solution and the metal hydroxide solution to run down simultaneously into a reaction vessel, keeping pH value, temperature and concentration in each step constant.

The invention relates to a method for producing electrochemically active material for the nickel hydroxide electrodes in alkaline accumulators and to apparatus for the purpose. According to known procedures of the kind, a solution of a metallic salt, for example nickel sulphate, is allowed to run down into a large precipitation tank containing caustic soda. Owing to practical considerations in conjunction with the treatment process the quantity of the two components in the reaction entails a time of about ½ hour for addition of the metallic solution. The suspension is then left to stand for about 8–15 hours and the precipitation is finally concluded by adding more caustic soda for about 10 min. The resulting precipitate is filtered off, washed and dried in a dehydrator, washed and dried again and ground, graphitized, compressed, crushed and screened. This is accordingly a batchwise procedure, and in order to obtain a uniform composition of the compound a mixture is customarily made from ten to fifteen different batches of the compound in a mixing drum.

In this way one obtains to some extent a nickel hydroxide compound of standard type which is then used for different types of alkaline accumulators with pocket electrodes, both those which are to have a high capacity and those for which loadability is a primary requirement. The investigations on which the invention is based have shown that the requirements which should be placed on a compound in respect of structure and electrochemical properties differ for a high capacity compound and for a compound which is to result in a long life of an accumulator.

It has also appeared from these investigations that it is necessary to be able to check the crystallinity, residual sulphate content and weight by unit of volume of the resulting compound in a reproducible manner.

Figure 1:
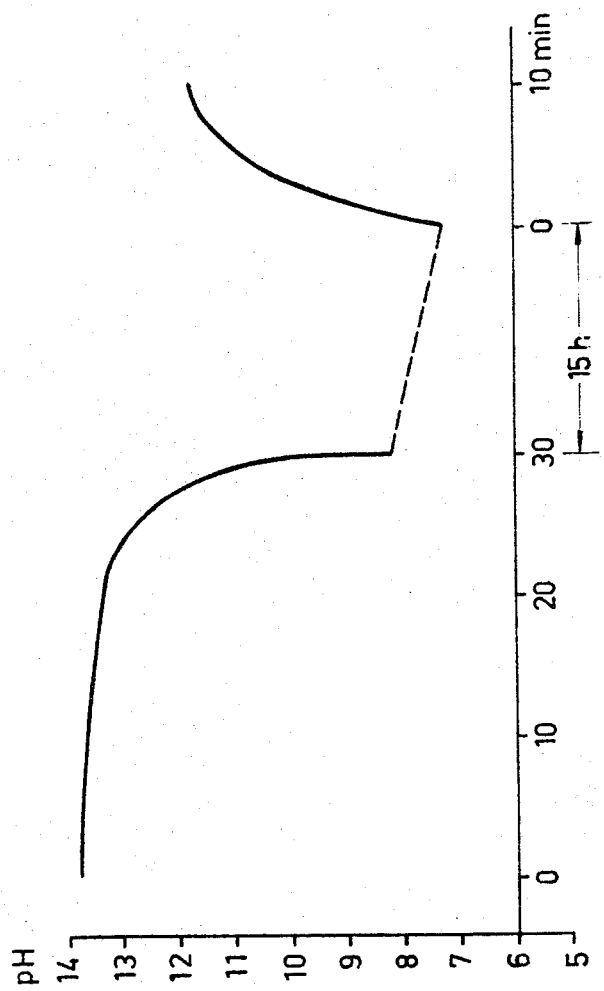

Using known procedures this has not been possible. The investigations made by the inventor show that the process in such a procedure is largely as illustrated in FIG. 1 of the attached drawing. This figure shows the relation between the pH value in the suspension and the time of the reaction. In such a procedure it is usual to use a pH value of around 14 which, as the metallic salt solution is added, falls—first very slightly and later more steeply—to a value of about pH 8. During the time, 8–15 hours, in which the suspension is left standing, the pH vlaue falls, as appears from the diagram, to about 7.5, thereafter rising again steeply to about 11.5, when further caustic soda is added. It now proves that during the first flat portion of the curve a chiefly crystalline precipitate is produced, whereas during the falling, steep portion and the rerising course of the pH value the precipitate is amorphous. It will thus be realized that the end product consists of a mixture of crystalline and amorphous precipitate.

The object of the present invention is to produce a precipitate having a defined and uniform crystal structure by means of a procedure which makes the precipitate easy to filter and more easily washable, whereby the manufacture can be done more simply and more quickly.

The invention thus relates to a method for producing an electrochemically active material of the kind in question in the form of one or more metal hydroxides by precipitation of the hydroxide or hydroxides from a solution of one or more metallic salts with the aid of an alkaline metal hydroxide solution (caustic soda) and is characterized essentially in that, in order to obtain a uniform crystal structure of the material (i.e. the same X-ray crystallinity throughout it), the precipitation takes place continuously in at least one step by allowing the metallic salt solution and the caustic soda to run down simultaneously into a reaction vessel, the pH value, temperature and concentration being kept constant during the precipitation in each such step.

According to a favourable further development of the invention the pH value, temperature and concentration of the reaction components during the first precipitation step are so adjusted that the precipitation product obtained in this step obtains a crystal structure corresponding to the desired electrochemical characteristics of the end product.

According to another development of the invention a second precipitation step is used, during which the greater part of the anions of the metallic salt or metallic salts absorbed in the hydroxide precipitate are released without alteration of the crystal structure that has been fixed in the hydroxide precipitate in the first precipitation step.

It is advisable during the first step of the precipitation to have a constant pH value within the range 7.5–10 and during the second step a constant pH value between 9.5 and 13. The temperatures during the precipitation process may be between 10° C. and 80° C., while the concentration of the solutions may have the following values for:

nickel from 5 to 100 g. Ni/l.
Co from 0.1 to 3 g. Co/l.
the caustic soda from 15 to 300 g. NaOH/l.

The invention relates also to apparatus for implementation of the procedure, which is characterized essentially in that it contains a first reaction vessel with agitator, a supply pipe for introduction of the metallic salt solution into this reaction vessel and a second pipe for introduction of the alkaline metal hydroxide solution into the said first vessel, a second reaction vessel, likewise with agitator, to which the suspension from the first vessel is conducted via a first pH meter and to which second vessel a third supply pipe is connected, which adds further alkaline metal hydroxide solution to the suspension, an outlet from the second vessel via a second pH meter to a device for separation of the precipitate, and a regulating device comprising a device for conversion of the measured pH value, a desired value unit, comparison devices, PID regulators and controls, for supervision of flow-regulating devices in the supply lines for control of the alkaline metal hydroxide solution in dependence on the pH values measured in the suspension.

The invention will now be described with reference to FIGS. 2, 3 and 4, where

Figure 2:
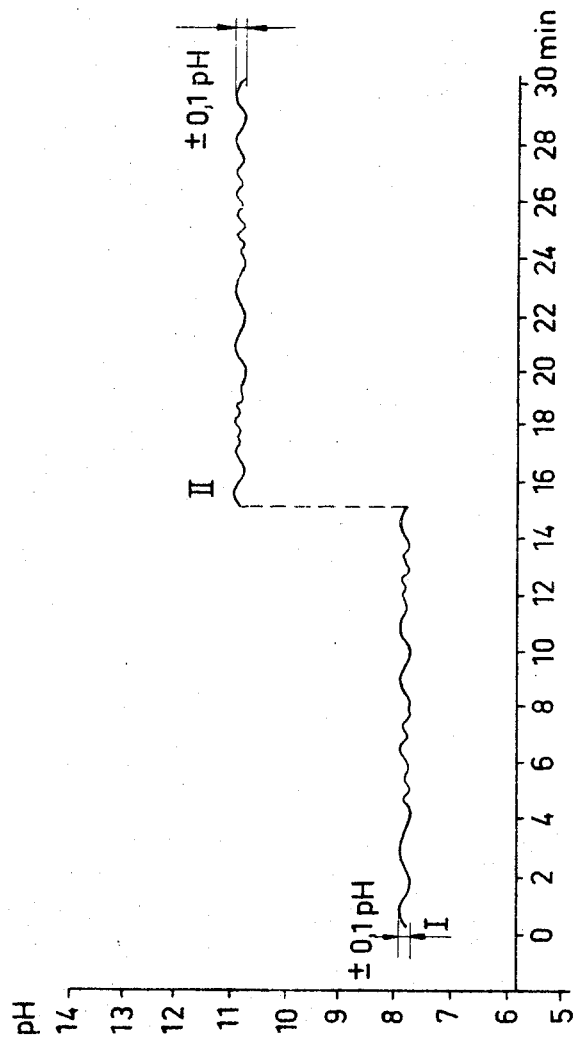
Figure 3:
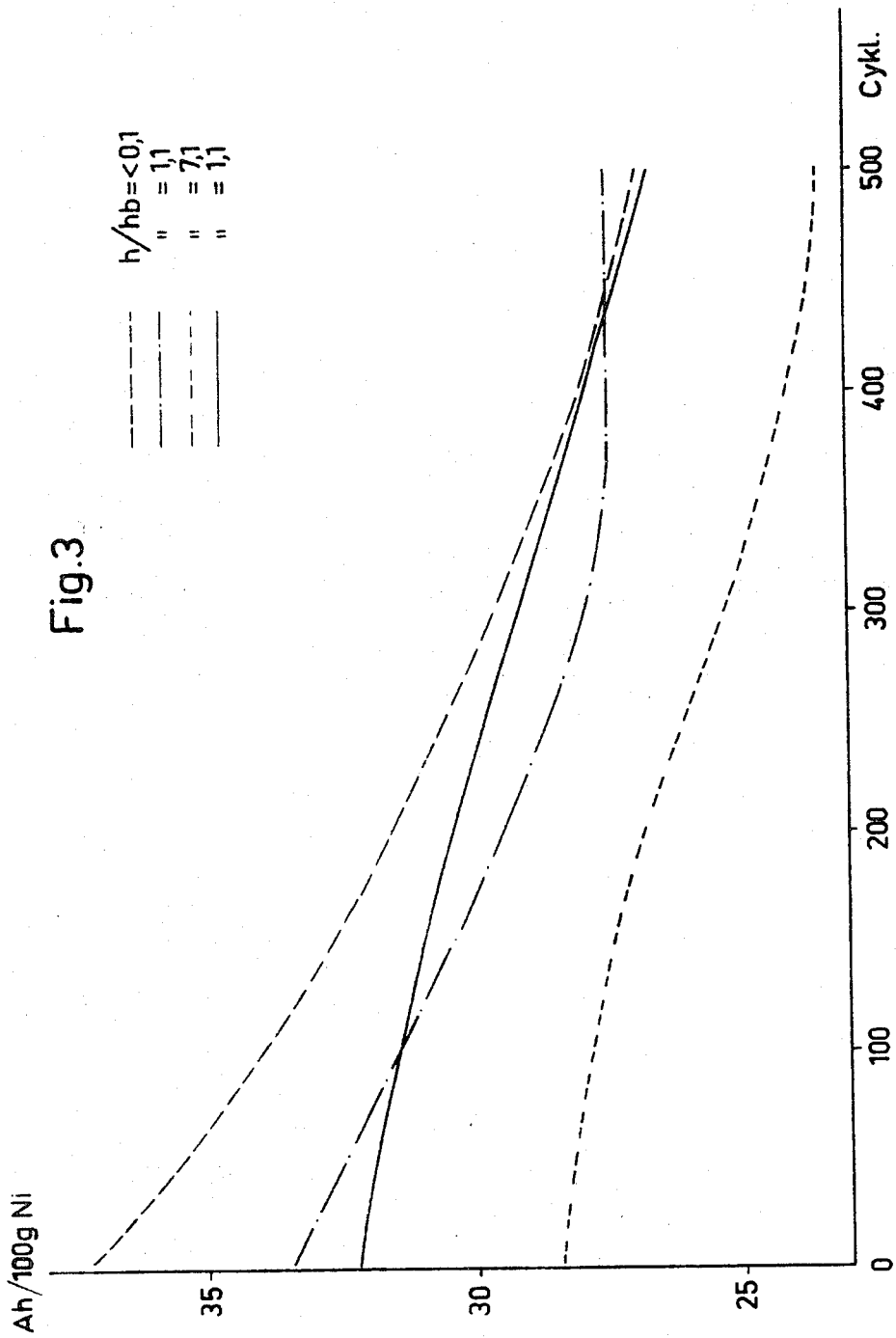
Figure 4:
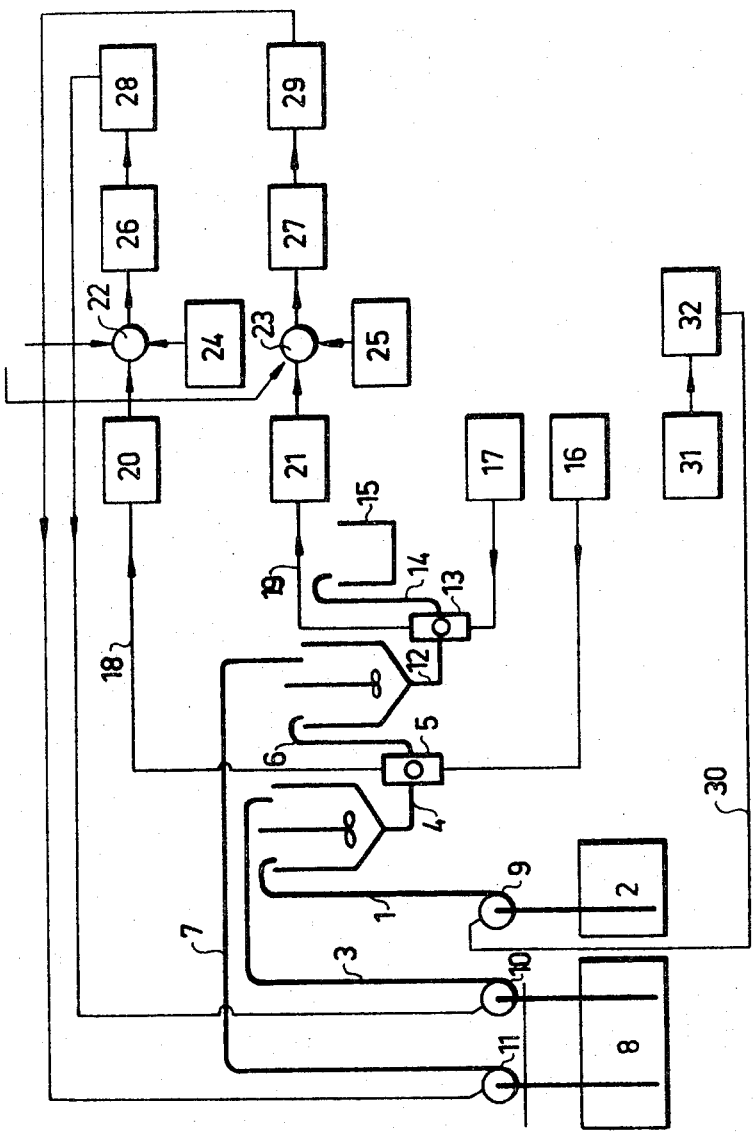

FIG. 2 shows a pH diagram of a precipitation process according to the invention, FIG. 3 shows the capacity curves for nickel hydroxide compound produced according to the procedure according to the invention, and FIG. 4 shows a block schematic of the precipitation apparatus according to the invention.

The invention is based on an observation made in conjunction with various attempts to precipitate nickel hydroxide, in which a solution of a nickel salt was allowed to run down into caustic soda and caustic soda was allowed to run down into a nickel salt solution. These precipitation tests were made at 25° C. and at 80° C. The filterability of the precipitates was studied. It was observed that in the first-mentioned procedure and also according to the second method of precipitation the precipitates were difficult to filter. Tests were then made with continuous precipitation, a nickel salt solution and caustic soda being allowed to run down simultaneously into a reaction vessel. It was found that with this method the precipitates varied from very difficultly to very easily filterable. This method thus provided a means of varying the properties of the precipitated nickel hydroxide. A number of precipitation tests were made in which nickel hydroxide was continuously precipitated at constant pH, temperature and concentration and one or the other of these parameters was varied systematically.

From these tests it was evident that a precipitate with amorphous structure is easily filtered while a crystalline precipitate is difficultly filtered.

The precipitate is thus affected by the pH value in the reaction vessel as follows.

Precipitation at pH 8 to 10 yields a principally amorphous precipitate. Precipitation at pH 11 to 13 yields a principally crystalline precipitate. If the critical point is passed in the precipitation, which lies between pH 10 and 11, this is clearly noticed through a sharp change in viscosity. The viscosity increases greatly within a small range close to the critical point and falls again after this is passed.

The temperature in the reaction vessel affects the precipitate as follows. At pH 8 to 10 precipitation at high temperature (80° C.) yields a more crystalline product than at low temperature (20° C.), while the reverse applies at pH 10 to 13.

The above dependence on pH and temperature applies to the use of concentrations of solutions that are at present customary in fabrication, i.e. 62 g. Ni/l. and 167 g. NaOH/l. Precipitation in more dilute solutions favours the formation of a crystalline product. At 10× dilution a low pH also leads to a crystalline precipitate. Higher than normal concentrations yield pulpy precipitates in which there are large quantities of $Na_2SO_4$ crystals.

By adjustment of pH, temperature and concentration in continuous precipitation it is thus possible to control the structure of the precipitate. The temperature and concentration of solutions used can be simply kept constant, whereas the pH must be controlled by regulation of the mixing ratio.

Having regard to the importance of easy filterability and washability of the precipitate for a manufacturing process, these properties have been investigated at different degrees of crystallinity of the precipitate.

The results may be interpreted in the manner that an amorphous precipitate is more permeable to the washing fluid than a crystalline precipitate. The filtering-off time for a 0.5 l. suspension on a 175 cm.² filter in the tests was 4 to 6 mins. On the other hand the amorphous precipitate proved to retain more $SO_4$ than the crystalline after washing with the same quantity of water. A crystalline precipitate proved to have a low permeability for the washing fluid and the filtering-off time was 40 to 60 min. It was found, on the other hand, that the $SO_4$ content could be almost completely washed out, though this took a long time.

As mentioned, the precipitation by methods known hitherto takes place at sliding pH, which results in a mixture of crystalline and amorphous nickel hydroxide. The filtering-off time for such precipitation is 20 to 30 mins. In attempts to wash the precipitates of crystalline material obtained in the aforementioned tests to a residual sulphate content of max. 0.75% immediately after the filtration, however, total filtering-off and washing times of 6 to 27 hours were obtained, which implies that a purely crystalline structure should not be striven for in practical production.

One should instead adopt the principle of precipitating amorphous nickel hydroxide in order to obtain better washability, while retaining the very desirable characteristic of high rate of filtration. It is found, however, that amorphous precipitates cannot be washed sufficiently free from $SO_4$. The addition of caustic soda directly to the suspension immediately after the precipitation, however, proves to have a markedly favourable effect in this respect.

These findings result in the devising of the following method, given by way of example, for continuous precipitation of a nickel solution containing, for example, about 85 g. Ni/l.+1.3 g. Co/l. with a NaOH solution of specific gravity 1.16 at a constant pH<10.5 and room temperature. The suspension is allowed to run from the first reaction vessel to a second vessel in which NaOH solution is added continuously so that the pH remains >10.5. The precipitate is filtered off without washing and is dried at 110 to 120° C. This is followed by washing on a suction filter, first twice with 0.125-M ammonia, thereafter 3 to 5 times with water. The washing fluids should be heated to about 80° C. Finally the material is dried again at 120° C. By this method the filtering-off time is reduced from 20 to 30 mins. in known processes to 3 to 8 mins. for continuous precipitation according to the invention in filtering tests on a 175 cm.² suction filter. The finished product has a high density >1.0. The sulphate content varies between 0.1 and 1.2%. These variations depend chiefly on the pH chosen in the second precipitation step. A low pH gives the higher sulphate values. FIG. 2 shows the course of the pH for continuous precipitation of this kind in two steps. The reaction time is plotted on the abscissa and the pH on the ordinate. In the example given the pH in the suspension in the first vessel has been kept at 8 and in the second vessel at 11; the variation have been ±0.1 pH. This means that, if one follows a given portion of the suspension, the suspension in step I will be kept at pH 8 and, after running over to the second vessel, suddenly rises to pH 11. The process thus has the two-step character shown in the diagram.

In this precipitation method the precipitate will be more or less amorphous. The decisive factor for the crystalline structure is the pH at the moment of precipitation. The raising of the pH to the final value can be done immediately after the precipitation without appreciable effect on the crystal structure. A high final pH must be used to permit washing out of $SO_4$. This two-step method implies that an amorphous precipitate can be otbained despite the high pH required for low residual $SO_4$. The best result appears to be obtained when the precipitation is done at room temperature, which also has the advantage that no heating of the solutions is required.

After a method had been devised in this way which is advantageous from the production aspect, the investigation was extended to comprise also the electrochemical characteristics of the material.

To obtain sufficiently good reproducibility it is necessary to introduce some form of automatic regulation of the pH of the precipitate. This is arranged as follows. In two vesesls at different levels (level vessels), one for nickel solution and one for caustic soda, the respective solutions are kept at a constant level with pumps and spillways. The vessels have bottom outlets from which lead hoses to a reaction vessel placed at a lower level. This consists of 1 l. container in which is sealed a pipe as a spillway. Before entering the reaction vessel the hoses pass magnetically operated devices which can compress the hoses so as to stop the flow. These compressing devices are operated via relays by the deflection of a potentiometer recorder which in turn is connected to a pH meter which continuously measures the pH in the reaction vessel. If the pH rises above or falls below a preset interval, the flow of caustic soda and nickel solution is cut off, being reopened when the pH enters the working range. To prevent the system from oscillating, a damping effect can be introduced in the form of a pulsated feed current to the magnetic valves with manually variable pulse width. The precipitate leaving the reaction vessel via the spillway is collected in a larger vessel. After the required quantity has been produced, the precipitation is interrupted and more caustic soda is added to the collected suspension under vigorous agitation. Frequent pH measurements are made. When the desired pH has been reached, the addition of caustic soda stops. From the resulting suspension a 500 ml. sample is withdrawn from which the precipitate is filtered off on a 175 cm.$^2$ suction filter without any standing time. The precipitate was then dried at 110° for 24 hours. The subsequent washing was done on a filter of the same size as for the first filtering. Washing was done first with 2× 5 ml. 75° ammonia solution containing 10 ml. conc. $NH_4OH/l$, then with 6× 500 ml. 75° water. The final drying, like the first drying, was done at 110° for 24 hours. The final product was ground by hand in a grinding bowl so that the whole passed through a screen of 0.3 mm. mesh.

Samples were taken from precipitation tests according to the above procedure at 25° and 75°, pH 8.0, 9.0, 9.5 and 10.0 in the first step. Each of the precipitations was adjusted to pH 11, 12 and 13 at 25° and to 9.5, 10.5 and 11.5 at 75° in the second step.

Each sample was examined in respect of filtering-off time, residual sulphate content and weight by unit of volume. To obtain a classification of the electromechical characteristics X-ray diffraction tests were made of the samples in the experimental series precipitated at pH 8, 9 and 10.

The results show that, within the temperature ranges (25°/25° and 75°/75°) most suited to the process, the pH in step 1 affects the filtering-off time and in step 2 the residual sulphate content and weight by unit of volume, while both pH affect the crystallinity.

These experiments show that by changing the pH's conditions in th precipitation the X-ray crystallinity can be simply changed from fully amorphous to a diffractogram value of h./hb.=7 (h./hb.=height/half-height at d=4.60 A. (d=distance between atomic planes), whereas known standard precipitates have a value of around 1.5. To investigate the performance of the various materials in cells, a number of precipitates have been prepared on a pilot plant scale. Points of operation were chosen which yield (1) very low crystallinity h./hb. <0.1, (2) for standard compound normal or rather lower crystallinity h./hb. 0.5 to 1.5, and (3) high crystallinity h./hb. 7. Within each group the points of operation were chosen which yield the highest possible rate of filtering without too high residual sulphate contents. The results will be seen from FIG. 3. The tests show that compounds with normal or rather lower crystallinity result in a rather better initial capacity than the known standard compounds. Compounds with amorphous structure result in 10 to 15% higher initial capacity and compound with high crystallinity 11% lower initial capacity than the normal standard compound. Tests of charging and discharging voltages and loading capacities show a normal result.

On the basis of the observations made the precipitation apparatus shown by way of example in FIG. 4 has been developed.

The precipitation operation is performed in two steps. In the first step nickel sulphate solution is introduced into a reaction mixture with a specific hydroxyl ion excess. The process works continuously through an outlet and sodium hydroxide solution is added at a rate such that a constant OH excess is maintained. In the second step more sodium hydroxide solution is added so that a greater OH excess is obtained. To obtain a uniform product with defined characteristics, adequate agitation in the reaction vessels and good pH stability are required. The precipitation unit has been designed with these points in mind.

As appears from FIG. 4, the precipitation unit for continuous nickel hydroxide solution comprises a first reaction vessel I with agitator, a feed pipe 1 for supply of metallic salt solution to the reaction vessel from a storage vessel 2. To the reaction vessel I there runs also another feed pipe 3 for addition of the alkaline metal hydroxide solution, in this case caustic soda. A second reaction vessel II, likewise with agitator, is placed in a position not shown in the drawing such that this vessel has an upper level slightly below the upper level of the first vessel. The suspension from the first vessel I is taken through a pipe 4, connected to a bottom outlet, with a pH meter 5 and a pipe 6 to the second reaction vessel II. To this vessel there runs also a third feed pipe 7 which in the reaction vessel II adds to the suspension further caustic soda, preferably from the same tank 8, from which caustic soda is led to the first vessel. In the embodiment exemplified pipes 1, 3 and 7 are equipped with speed-regulated dispensing pumps 9, 10 and 11, respectively. Use may, however, also be made of other flow-regulating devices such as valves. From a bottom outlet in vessel II the suspension is led through a pipe 12, a pH meter 13 and a pipe 14 to a separating unit 15 in which the precipitate is separated from the liquid phase. To keep the pH electrodes free from coatings, ultrasonic generators 16 and 17 are used for ultrasonic cleaning. The pH values from the pH meters 5 and 13 are transmitted on leads 18 and 19, respectively, to devices 20 and 21 for conversion of measured pH values, which transmit the respective measured values to comparison units 22 and 23, which compare the measured values with desired values set in the desired-value setting units 24 and 25. The differences are taken to PID regulators 26 and 27 which, via thyristor control devices 28 and 29, regulate the speed of the dispensing pumps for the caustic soda. The speed of pump 9 for supply of metallic salt solution to reaction vessel I can be set manually via a lead 30 with a manually adjustable variable voltage transformer 31 which feeds the pump motor via a silicon rectifier 32.

The operation of the precipitation unit should be apparent from the earlier description of the precipitation process. The production level is determined by manual setting of the speed of the lifting pump for the metallic salt solution, after which the two caustic soda pumps automatically follow, so that the preset desired value of the pH in the two precipitation steps is obtained.

Although the invention has been described with reference to one of its embodiments, it can be arbitrarily varied within the scope of the subsequent claim.

What I claim is:

1. In a method of producing an electrochemically active material consisting essentially of nickel hydroxide and cobalt hydroxide comprising precipitating said hydroxides from a solution of a nickel salt and a cobalt salt, with the aid of an alkali metal hydroxide solution, the improvement comprising continuously precipitating said nickel hydroxide and said cobalt hydroxide at a constant temperature, pH and concentration of nickel salt, cobalt salt and alkali metal hydroxide in two precipitation steps by:

(a) simultaneously introducing said solution of said nickel salt and said cobalt salt and an alkali metal hydroxide solution into a reaction zone in a first precipitation step, the pH during the first precipitation step being maintained constant between 7.5 and 10.0 to obtain a desired crystal structure and the nickel concentration in said solution of nickel salt and cobalt salt being maintained constant at a level of from about 5 to 100 grams per liter of solution and the cobalt concentration in said solution of said nickel salt and cobalt salt being constant at a level of from about 0.1 to 3 grams per liter of solution;

(b) simultaneously introducing the resulting suspension of the precipitated hydroxides from the first precipitation step and an alkali metal hydroxide solution into a reaction zone in a second precipitation step, the pH during the second precipitation step being maintained constant between 9.5 and 13 and sufficient to eliminate the greater part of the metallic anion impurities without altering the crystal structure obtained in said first precipitation step; and (c) washing the precipitate from step (b) to remove any impurities contained therein; the concentration of the introduced alkali metal hydroxide solutions being maintained constant during each one of said precipitation steps at a level of from 15 to 300 grams per liter of solution, the temperature during each one of said precipitation steps being maintained constant between 10 and 80° C., to thereby precipitate an electrochemically active material consisting essentially of nickel hydroxide and cobalt hydroxide.

References Cited

UNITED STATES PATENTS

| 2,845,333 | 7/1958 | Schaufelberger | 23—183 |
| 2,950,172 | 8/1960 | Pincott | 23—183 |
| 3,208,823 | 9/1965 | Baker et al. | 23—182 R |
| 2,602,072 | 7/1952 | Kirkpatrick | 23—183 |
| 3,086,845 | 4/1963 | Malley et al. | 23—143 |

FOREIGN PATENTS

| 1,080,119 | 8/1967 | Great Britain | 23—183 |

ALLEN B. CURTIS, Primary Examiner

H. A. FEELEY, Assistant Examiner

U.S. Cl. X.R.

136—29